US012331562B2

(12) United States Patent
Schroll

(10) Patent No.: US 12,331,562 B2
(45) Date of Patent: Jun. 17, 2025

(54) ELECTRO-MECHANICALLY LOCKING COMPRESSION LATCH

(71) Applicant: The Eastern Company, Naugatuck, CT (US)

(72) Inventor: Matthew Schroll, Glendale Heights, IL (US)

(73) Assignee: The Eastern Company, Naugatuck, CT (US)

( * ) Notice: Subject to any disclaimer, the term of this patent is extended or adjusted under 35 U.S.C. 154(b) by 109 days.

(21) Appl. No.: 18/496,040

(22) Filed: Oct. 27, 2023

(65) Prior Publication Data

US 2024/0141705 A1 May 2, 2024

Related U.S. Application Data

(60) Provisional application No. 63/420,316, filed on Oct. 28, 2022.

(51) Int. Cl.

| | |
|---|---|
| ***E05B 83/00*** | (2014.01) |
| ***E05B 81/06*** | (2014.01) |
| ***E05B 81/14*** | (2014.01) |
| ***E05B 81/30*** | (2014.01) |
| ***E05B 81/44*** | (2014.01) |
| ***E05B 81/54*** | (2014.01) |

(52) U.S. Cl.

CPC .............. *E05B 83/00* (2013.01); *E05B 81/06* (2013.01); *E05B 81/14* (2013.01); *E05B 81/30* (2013.01); *E05B 81/44* (2013.01); *E05B 81/54* (2013.01)

(58) Field of Classification Search

CPC .......... E05B 83/00; E05B 81/06; E05B 81/14; E05B 81/30; E05B 81/44; E05B 81/54

See application file for complete search history.

(56) References Cited

U.S. PATENT DOCUMENTS

| | | | | | |
|---|---|---|---|---|---|
| 3,285,043 | A * | 11/1966 | Dauenbaugh | E05B 5/003 | 70/208 |
| 5,027,624 | A * | 7/1991 | Agbay | E05B 67/365 | 70/386 |
| 5,251,467 | A * | 10/1993 | Anderson | E05C 3/042 | 70/451 |
| 6,354,650 | B2 | 3/2002 | Terhaar et al. | | |
| 7,401,484 | B1 * | 7/2008 | Holmes | E05B 13/10 | 70/423 |

(Continued)

OTHER PUBLICATIONS

Eberhard Manufacturing Co., "Sealed Trigger Latch, Locking," 1 p. (Oct. 21, 2022).

(Continued)

*Primary Examiner* — Mark A Williams

(74) *Attorney, Agent, or Firm* — Leydig, Voit & Mayer, Ltd.

(57) ABSTRACT

A locking compression latch that can be changed from a locked state to an unlocked state either mechanically by turning an appropriate key in a key plug or electrically by an electric signal. Once in an unlocked condition, the compression latch can be opened by rotating a latch lever that disengages a protrusion on the latch lever from a striker mounted on the base of the compression latch. The compression latch can be changed from a locked to an unlocked condition by the electrical signal while the key plug is in the locked position.

16 Claims, 9 Drawing Sheets

(56) References Cited

U.S. PATENT DOCUMENTS

| | | | | |
|---|---|---|---|---|
| 8,474,290 | B2 * | 7/2013 | Terhaar | E05B 83/26<br>292/DIG. 43 |
| 8,814,094 | B2 * | 8/2014 | Tran | E05B 47/023<br>292/201 |
| 8,974,641 | B2 * | 3/2015 | Weber | F03G 7/0631<br>292/216 |
| 11,203,324 | B2 | 12/2021 | Schroll et al. | |
| 11,255,108 | B2 * | 2/2022 | Leung | E05B 47/0012 |
| 11,359,405 | B2 | 6/2022 | Misner | |
| 11,577,693 | B2 | 2/2023 | Schroll et al. | |
| 11,624,533 | B2 | 4/2023 | Kang et al. | |
| 2004/0012208 | A1 * | 1/2004 | Ruiz | E05B 65/006<br>292/64 |
| 2008/0060396 | A1 * | 3/2008 | Harvey | E05B 81/25<br>70/237 |
| 2009/0151409 | A1 * | 6/2009 | Baic | E05C 3/06<br>70/157 |
| 2012/0235425 | A1 * | 9/2012 | Do | E05C 1/065<br>292/150 |
| 2022/0136285 | A1 * | 5/2022 | Judah | E05B 83/28<br>70/279.1 |

OTHER PUBLICATIONS

Eberhard Manufacturing Co., "Sealed Trigger Latch, Non-Locking," 1 p. (Oct. 21, 2022).

* cited by examiner

ELECTRO-MECHANICALLY LOCKING COMPRESSION LATCH

CROSS REFERENCE TO RELATED APPLICATION

This patent application claims the benefit of, and priority to, U.S. Provisional Patent Application No. 63/420,316, filed Oct. 28, 2022, which is incorporated by reference herein in its entirety.

BACKGROUND

There is a need for a lockable compression latch that has the facility for the latch to be changed from a locked to an unlocked condition either by an electric signal or manually by turning a key. It is desirable to have such lockable latch in a sealed or contiguous housing for weather resistance, ease of manufacture and reduction of space, for use, as an example, as a replacement or retrofit for an existing manually lockable compression latch. It is also advantageous for the latch, when operated electrically, to have a minimum draw of electrical current.

One application for such a lockable latch is in conjunction with vehicle accessories such as doors or openings for pick-up truck bed caps. Vehicle accessories of various types also provide vehicle users convenient ways to extend the usefulness of their vehicles. In many such accessories employed by users on their vehicles, the vehicle accessories include latches and locks for securing the accessory to the vehicle and/or securing contents being stored in or on the accessories. For example, an after-market pick-up truck cap may have a rear door that is hinged horizontally to swing upward when opened. The door may have a pair of compression latches at the lower outside corners of the door that partially squeeze weather stripping between the door and the frame of the cap or the top of the tail gate of the associated truck when closed to provide a weather resistant seal. Heretofore, many of these latches have been operated manually, and if lockable, required a manual key at the latch to lock and unlock.

Many vehicle accessories, such as doors for pick-up truck caps, include manual latches, some of which are compression latches, with locks with keys that are different from the key or fob for the vehicle itself. A need exists in the field of vehicle accessory latches, especially lockable latches including lockable compression latches, for devices, systems, and methods for locking and unlocking associated locks that provide users more convenience, that are weather resistant, less expensive and less time-consuming to install, that are easier to operate and maintain, that require fewer modifications to vehicles to which they are attached and/or to the vehicle accessories themselves, and which make attaching the vehicle accessories to vehicles and use in conjunction with the vehicle less likely to violate vehicle warranty conditions.

Needs exist in many other fields for electro-mechanically lockable compression latches, especially ones that can be retrofitted in the current space occupied by a strictly mechanically lockable compression latch, for example in cabinets and file cabinets to control the opening and locking of doors, panels and drawers.

SUMMARY

The invention provides a compression latch for releasably latching a first surface to a second surface comprising a base mounted on the first surface and having a striker, a first pivot axis associated with the base, a first lever pivotable about the first pivot axis having a first arm, with the first arm having a contact at its distal end for releasably contacting the second surface, with the first lever also having a second arm, the second arm having a latch lever pivotable about a second axis on the second arm of the first lever and having a first arm with a first side that cooperates with the striker to keep the first lever from pivoting when the latch lever first arm first side and the striker are engaged and a second side, the latch lever also having a second arm. A first means biases the first side of the latch lever into engagement with the striker. A plunger is mounted on the base for axial movement with respect to the base, the plunger having a cam shaped first end surface, a first end portion adjacent the first end having a first diameter. A second means biases the plunger in a first direction and into a locked condition wherein the latch lever first arm first side is engaged with the striker and the latch lever first arm second side is in contact with the plunger first end portion. An electric motor is mounted on the base and has an output shaft. Wherein, upon receiving an electrical signal to the motor, the output shaft moves the plunger axially against the urging of the second biasing means in a second direction opposite the first direction so the latch lever first arm second side is radially spaced from beyond the plunger first end into a first unlocked condition. A substantially cylindrical key plug is rotatably mounted on the second arm of the first lever and has a keyway with an opening at a first end to accept a key within the key plug and an actuator at a second end of the key plug, with the actuator having a cam end surface that cooperates with the cam surface at the first end of the plunger to move the plunger axially in the second direction against the urging of the second biasing means when the key and key plug are turned from a locked to an unlocked position so the latch lever first arm second side is radially spaced from beyond the first end of the plunger in a second unlocked condition. The latch can be opened in either the first or second unlocked condition by the operator pushing the latch lever second arm and pivoting the latch lever opposite the bias of the first spring disengaging the latch lever first side from the striker.

The invention also provides a compression latch for releasably latching a first surface to a second surface comprising, a base mounted on the first surface and having a striker, a first pivot axis associated with the base, a first lever pivotable about the first pivot axis having a first arm, with the first arm having a contact at its distal end for releasably contacting the second surface, a spring for biasing the first lever so the contact is pivoted away from the second surface, the first lever also having a second arm, the second arm having a latch lever pivotable about a second axis on the second arm of the first lever and having a first arm with a first side that cooperates with the striker to keep the first lever from pivoting when the latch lever first arm first side and the striker are engaged and a second side, the latch lever also having a second arm. A first means biases the latch lever so its first arm first side is engaged with the striker. A plunger is mounted on the base for axial movement with respect to the base, the plunger having a cam shaped first end surface and a first end portion adjacent the first end having a diameter. A second biasing means urges the plunger in a first direction and into a locked condition wherein the latch lever first arm first side is engaged with the striker and the latch lever first arm second side is in contact with the plunger first end portion. An electric force generator is mounted on the base so that, upon receiving an electrical signal, the force generator moves the plunger axially against the urging of the second biasing means in a second direction opposite the first direction so the second side of the first arm of the latch lever is radially spaced from beyond the end of the plunger first end. A key plug is rotatably mounted on the second arm having a keyway with an opening at a first end to accept a key within the key plug and an actuator at a second end of the key plug, the actuator having a cam end surface that cooperates with the cam surface at the first end of the plunger to move the plunger axially in the second direction against the urging of the second biasing means when the key and key plug are turned from a locked to an unlocked position so the latch lever first arm second side is radially spaced from beyond the first end of the plunger in a second unlocked condition. Whereby the latch can be opened in either the first or second unlocked condition by the operator pushing the latch lever second arm and pivoting the latch lever opposite the bias of the first biasing means disengaging the latch lever first arm first side from the striker and the spring pivots the first lever to move the contact away from the second surface.

In one embodiment, the first surface is the face of a door and the second surface is a frame around the door. In one embodiment the first and second biasing means are springs or resilient polymers.

The devices, systems, and methods for both manually and remotely locking and unlocking compression latches for vehicle accessories such as doors for pick-up truck caps disclosed herein provide users a number of beneficial technical effects and a more desirable user experience as compared to known vehicle accessory compression latches. Such benefits include, without limitation, greater convenience, being less expensive and less time-consuming to install, being easier to operate and maintain, requiring fewer modifications to vehicles to which they are attached and/or to the vehicle accessories themselves, and making attaching the vehicle accessories to vehicles as well as use of the accessories less likely to violate vehicle warranty conditions.

Further and alternative aspects and features of the disclosed principles will be appreciated from the following detailed description and the accompanying drawings. As will be appreciated, the principles related to devices, systems, and methods for remotely locking and unlocking vehicle accessory locks are capable of being carried out in other and different embodiments, and are capable of being modified in various respects. Accordingly, it is to be understood that both the foregoing general description and the following detailed description are exemplary and explanatory only and do not restrict the scope of the appended claims.

DESCRIPTION OF A PREFERRED EMBODIMENT

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice versa without limiting the scope of the disclosure to the exact number or type of such elements unless set forth explicitly in the appended claims. The terms configured, associated and configuration and association may be used herein to refer to a specified arrangement, or a structural size and shape.

Figure 1:
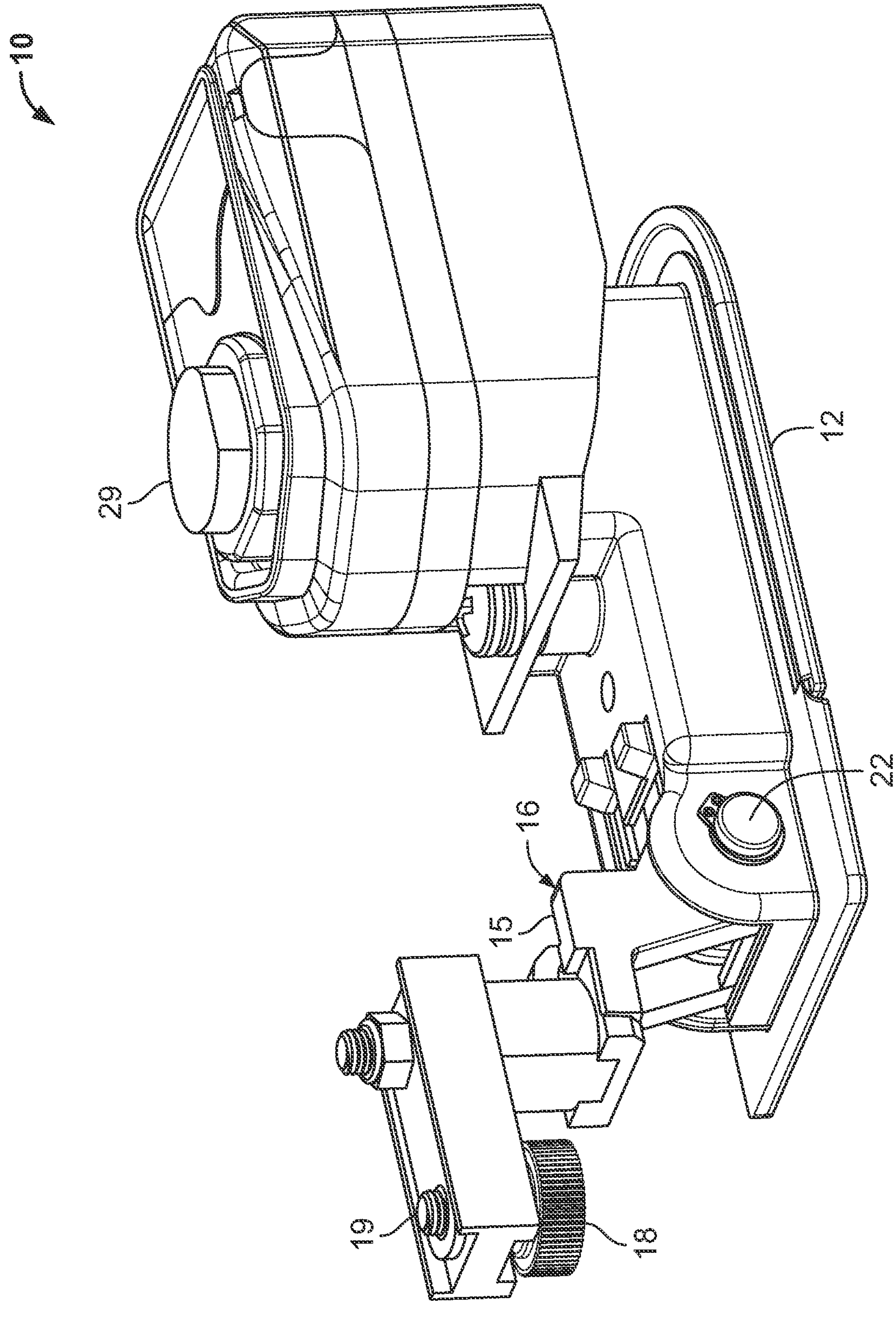
FIG. 1 is a perspective view of one embodiment of the inventive electro-mechanically locking compression latch.
Figure 2A:
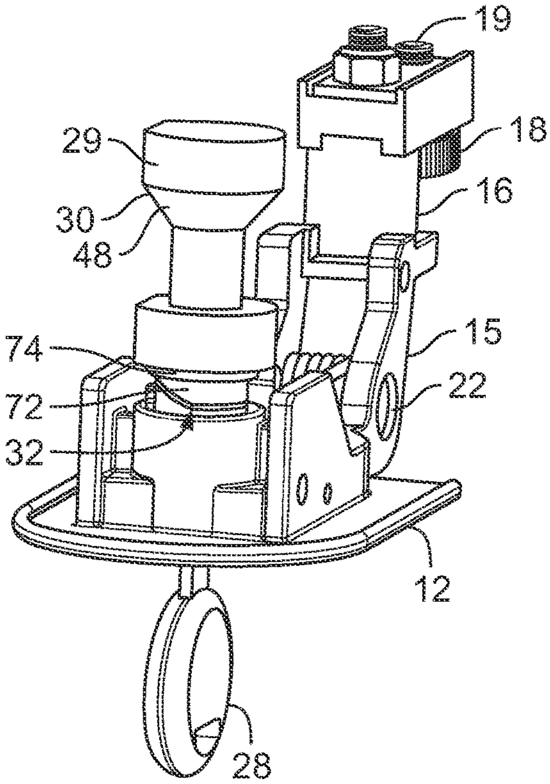
FIGS. 2A-E are various perspective views, detail views and a sectional view of one embodiment of the inventive electro-mechanically locking compression latch.
Figure 2B:
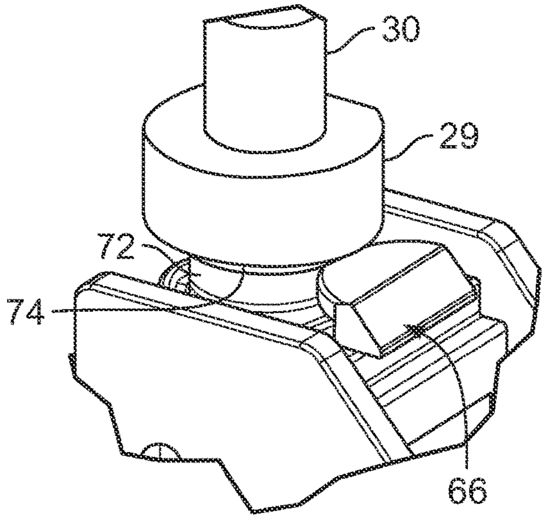
Figure 2C:
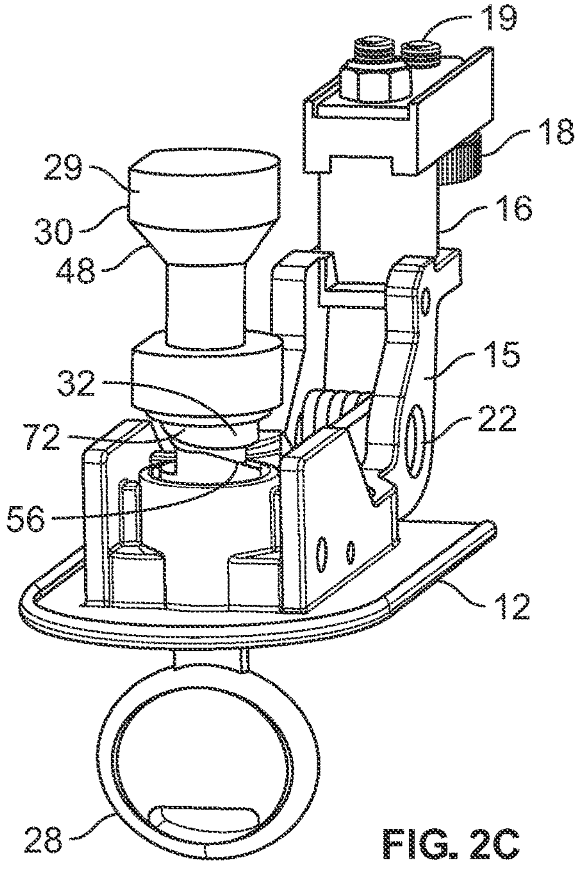
Figure 2D:
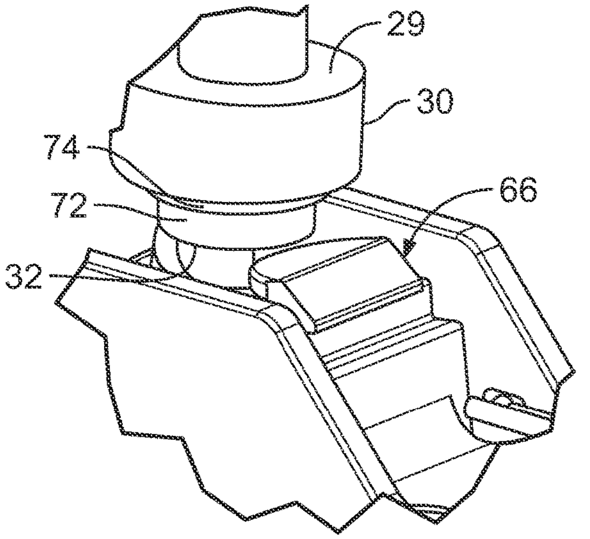
Figure 2E:
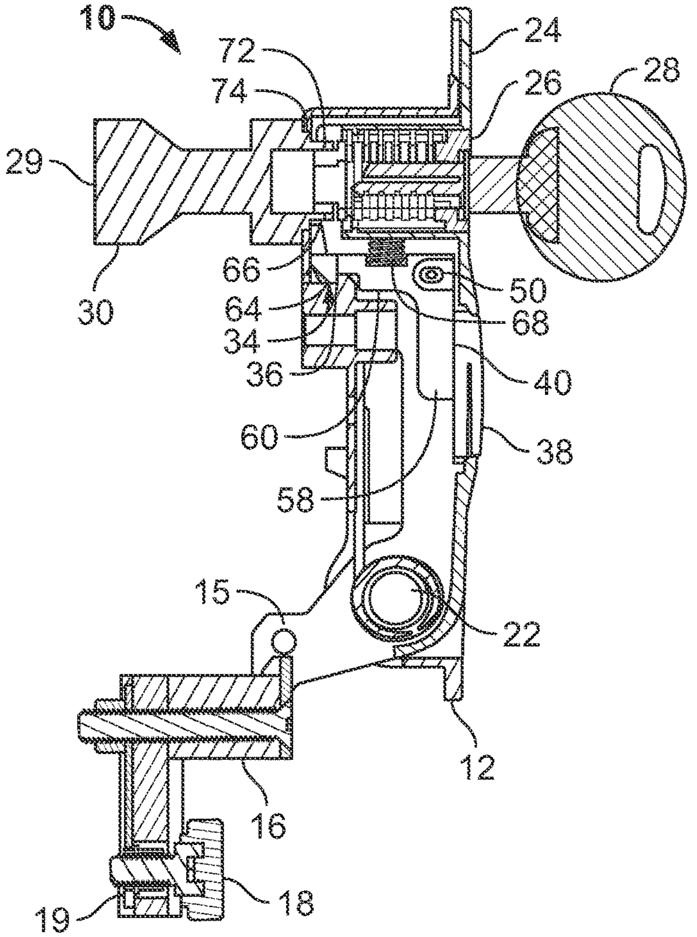
Figure 3:
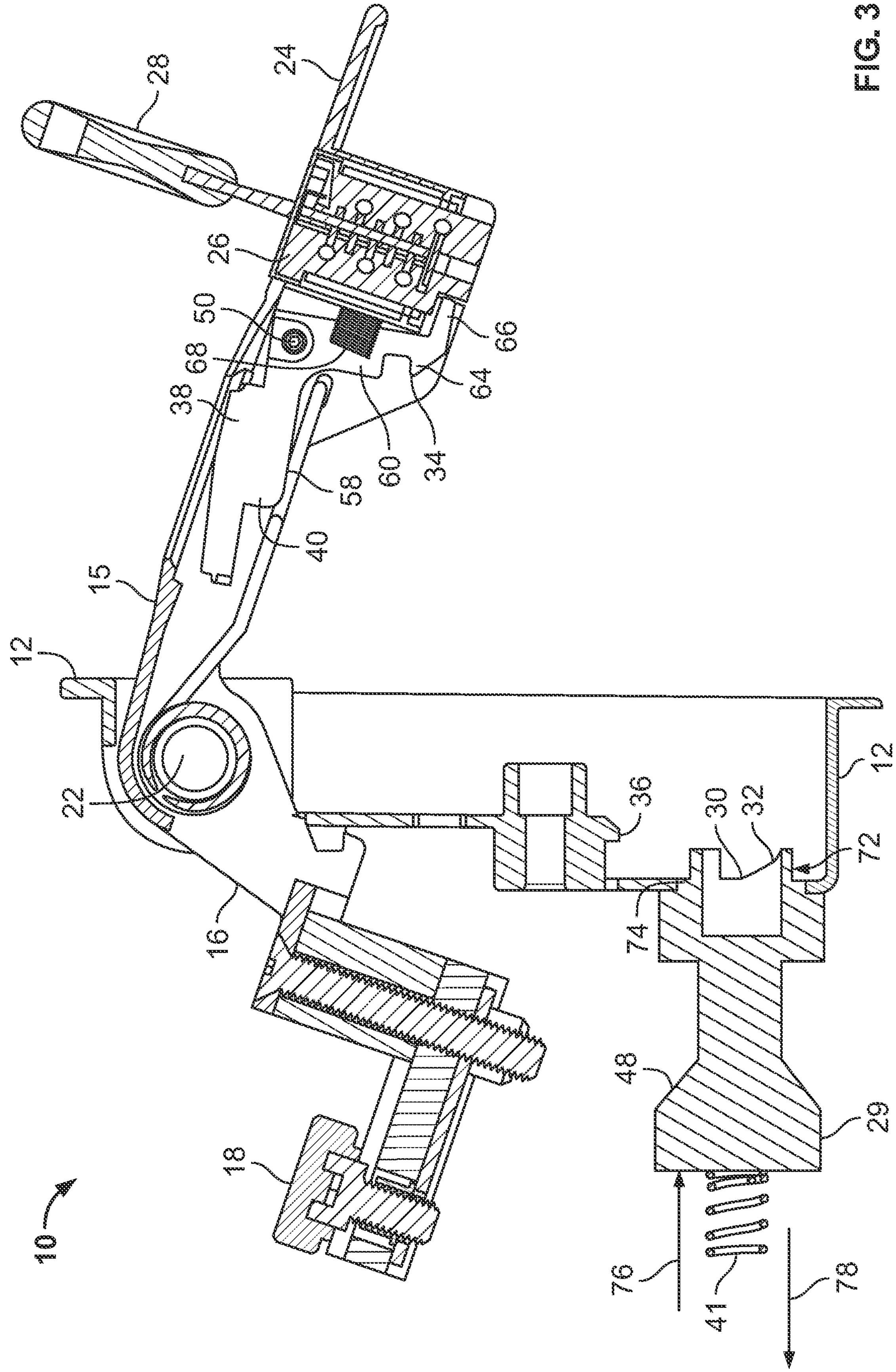
FIG. 3 is a sectional view of one embodiment of the inventive electro-mechanically locking compression latch.
Figure 4A:
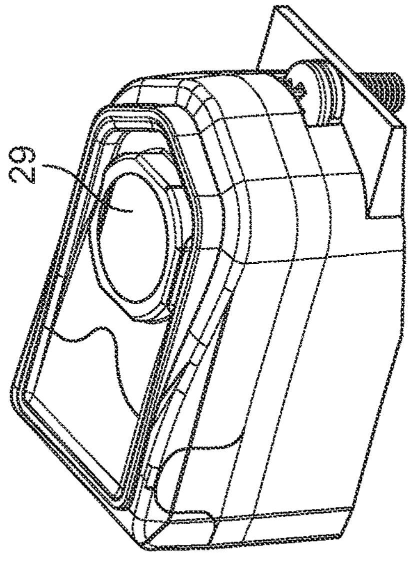
FIGS. 4A-D are perspective views and a side view of the inventive electro-mechanically locking compression latch in a locked condition with portions of the latch removed.
Figure 4B:
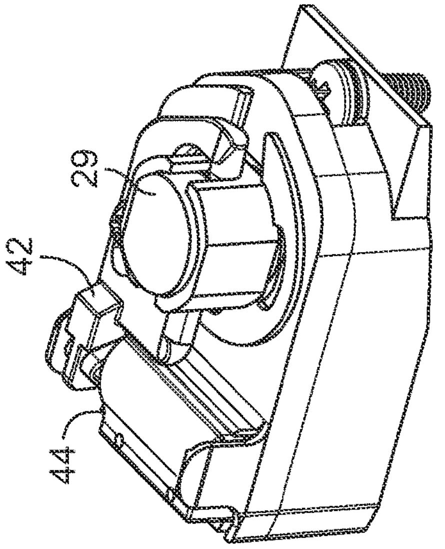
Figure 4C:
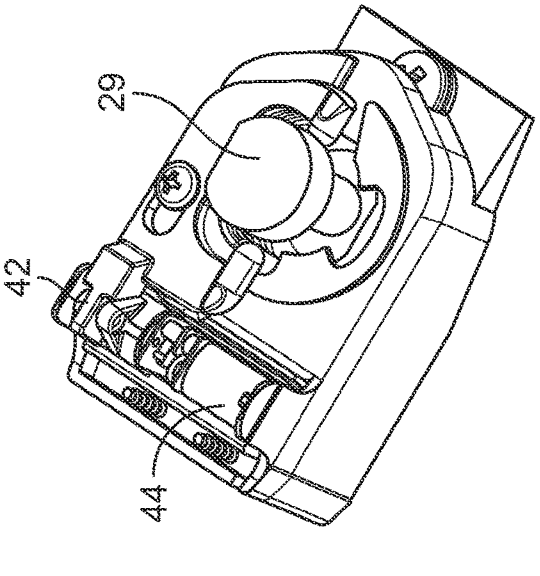
Figure 4D:
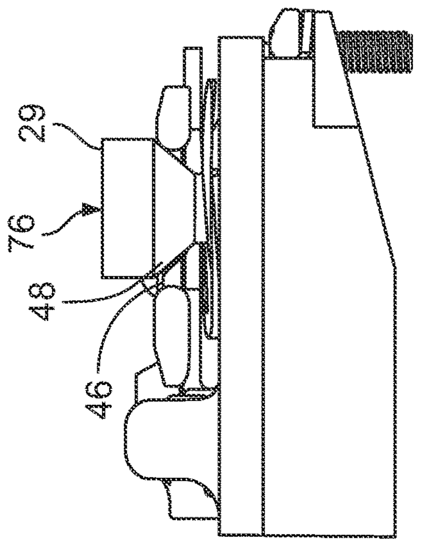
Figure 7:
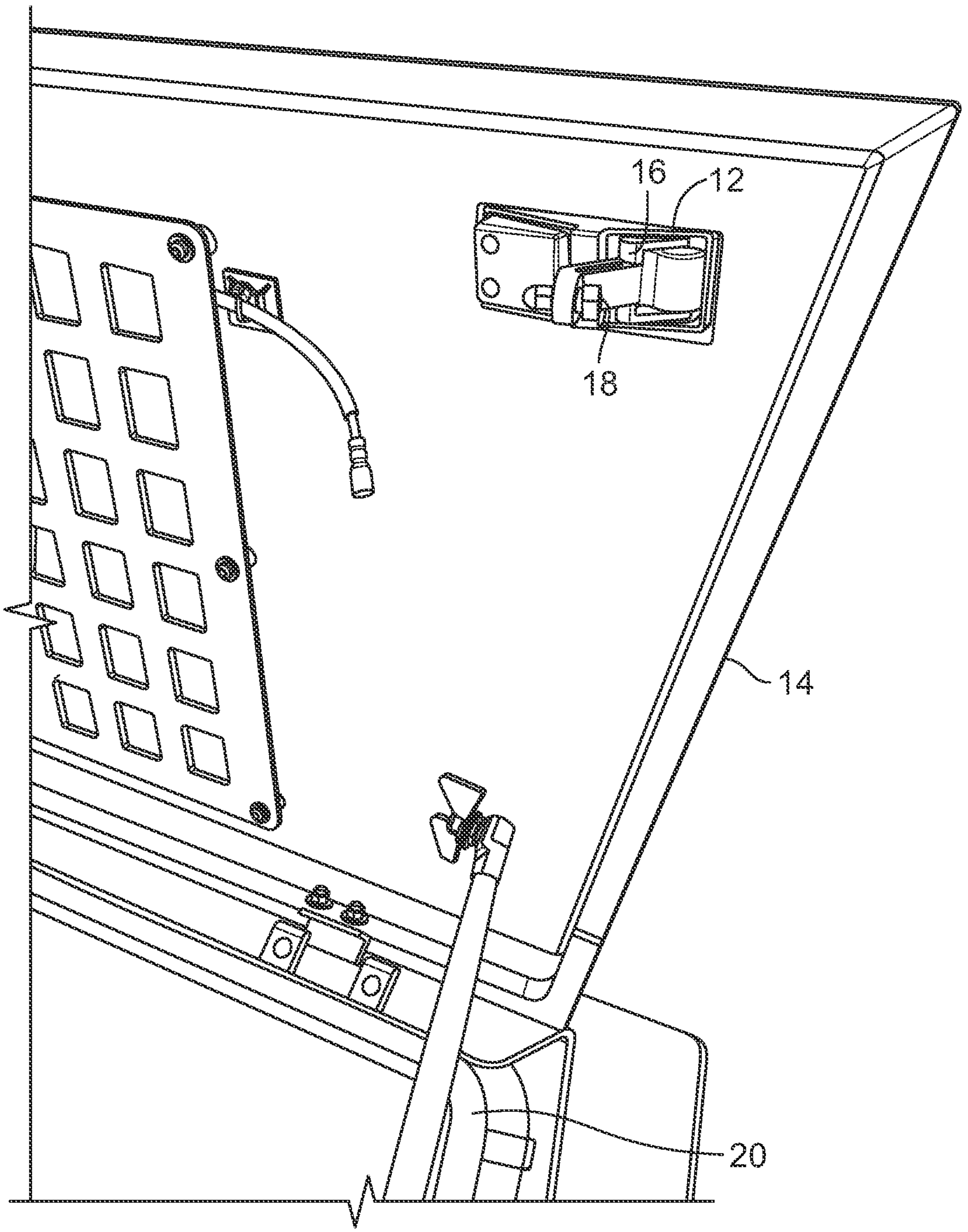
FIG. 7 is a depiction of an inventive compression latch in a door of a pick-up truck cap as seen from the inside of the door.
Figure 8:
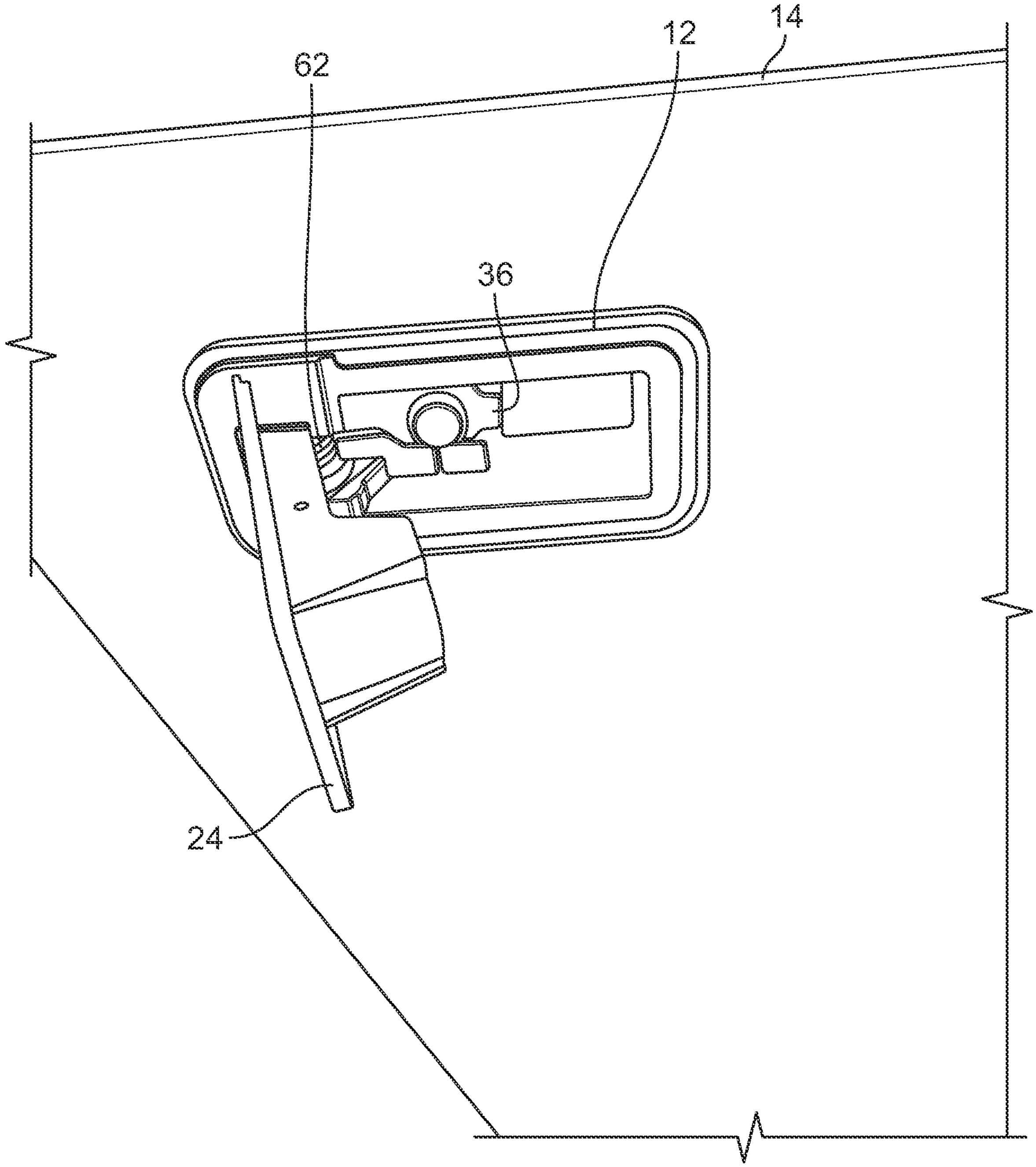
FIG. 8 is a depiction of an inventive compression latch in a door of a pick-up truck cap as seen from the outside of the door.

FIG. 1 shows a perspective view of the inventive electro-mechanically locking compression latch assembly 10 with a base 12 for mounting on a first panel or surface 14 such as the door of a pick-up end cap as seen in FIGS. 7 and 8 by conventional means such as threaded fasteners, adhesives or welding. The latch assembly 10 has a first lever 15 having a first arm 16 ending in a contact 18 at its distal end for contacting a second surface 20, such as a frame around the door, as seen at the bottom of FIG. 7, when in a closed condition. The contact is adjustable, preferably by threaded contact 19 with the end of the first arm 16. As shown in FIGS. 2E and 3, the lever 15 first arm 16 and second arm 24 pivot about the base 12 around pivot axis 22.

In one embodiment, the lever 15, including arms 16 and 24, are urged to an open condition by a spring 62. See FIG. 8. As is typical of compression latches, when the second arm 24 of lever 15 is pivoted by the user against the bias of the spring 62, to be rotated to and into a recess in the base 12, the first arm 16 pulls the second surface 20 or frame toward the first surface or door 14 to a closed condition. The latch 10 will remain in a closed condition until the operator pushes protrusion or button 38 to release the engagement of the latching protrusion or tooth 34 from striker 36, as will be more fully described herein. In one embodiment, the adjustability of the contact 18 allows the latch to create some compression between the first and second surfaces, for example slightly compressing weather stripping between the door and the frame of the truck bed cap to create a weather resistant seal.

As shown in FIGS. 2E and 3, the latch or latch assembly 10 second arm 24 of lever 15 also pivots about base 12 around pivot axis 22. Near its distal end, the second arm 24 has a generally cylindrical recess normal to the longitudinal axis of the arm in which a generally cylindrical key plug 26 resides. The key plug 26 has a first end with an opening 52 for a key 28 and a second end with a cam shaped actuator 54. With an appropriate key 28, the user can rotate the key plug 26 about its axis in the second arm 24 from a locked to an unlocked condition and vice versa. An appropriate key plug is more fully described in U.S. Pat. No. 11,359,405, assigned to the assignee of the instant application and incorporated in its entirety herein by reference. The end of the key plug 26 opposite the key entrance 52 has an actuator 54 having a cam surface 56 as shown, for example, in FIG. 6B.

The second arm 24 of first lever 15 also contains a second pivot 50. A second or latch lever 58 has a second arm 40, optionally with a button or raised surface 38 located on its back side. The second, or latch lever 58, pivots on the second arm 24 of the first lever 15 about pivot axis 50. The second, or latch, lever 58 also has a first arm 60 connected to the second arm 40 pivoting about the second axis 50. The distal end of the first arm 60 of the second or latch lever 58 has a first side 64 with a latching protrusion or tooth 34. In the latch assembly 10 closed condition, the second arm 24 of the first lever 15 remains oriented in a recess in the base 12 by the cooperation of the latch lever 58, with the latching protrusion 34 engaging a striker 36 on the base, See FIGS. 2E and 3.

Figure 6C:
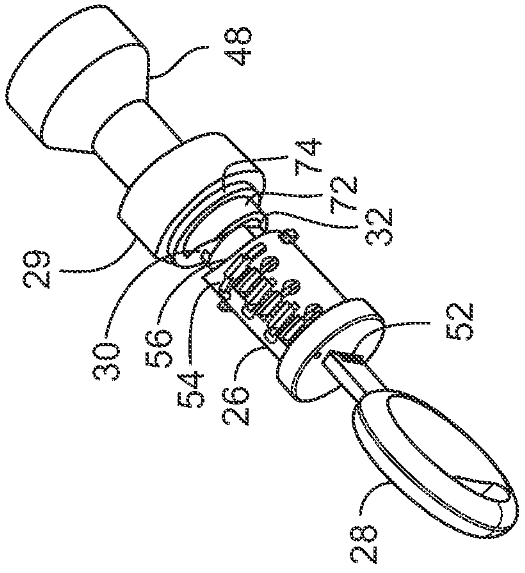
FIGS. 6A-C are detailed views of the plug and plunger of the inventive electro-mechanically locking compression latch in three states.
Figure 6B:
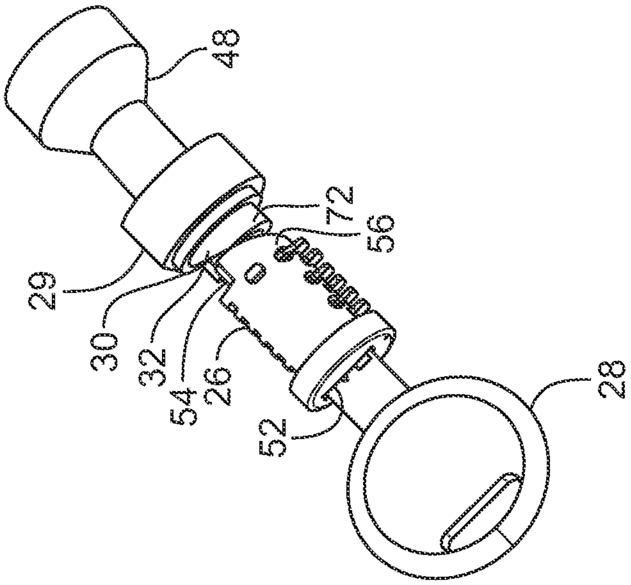

Second or latch lever 58 with its associated arms 40 and 60 pivots about the second pivot 50. Accordingly, when the raised portion or button 38, which optionally protrudes from the backside of the second arm 40 of the latch lever is pressed by the operator the arm 40 rotates against the urging of the first biasing means, preferably a spring or polymer pillow 68. This also rotates the latch lever, which moves the first arm 60 and latching protrusion or tooth 34 away from the striker 36. The latch lever 58 and first arm 60 can only rotate if the second side 66 of the first arm of latch lever 58 is not contacting the first end portion of plunger 29 in the unlocked condition as shown in FIGS. 6B and 6C. With the latch or latching protrusion 34 spaced from the striker 36, the spring 62 urges the first lever 15 into an open condition as shown in FIGS. 3 and 8.

The compression latch 10 can be changed from a closed to an open conditions when either the manual lock and key plug 26 is rotated to an unlocked condition or when the plunger 29 is moved to an unlocked condition by an electric signal to an electric force generator, such as a motor 44 or solenoid. The movement of the plunger 29 directly mechanically or in response to an electrical signal allows an operator to rotate the latch lever 58 against its bias as will be described hereinafter.

The first end 70 of plunger 29 cooperates with the second side 66 of the first arm 60 of the latch lever 58 to allow pivoting movement of the latch lever 58. The plunger 29 is located in the base 12 to allow for axial movement of the plunger normal to the base. The plunger 29 cannot rotate due to a flat on one side as seen, for example in FIG. 5B. The plunger 29 is biased in a first direction 76 by a second biasing means, such as a spring 41. The first end 70 of the plunger 29 has an end wall 32 with a helical or cam end surface 30. Adjacent the end wall 32 is a first stepped end portion 72 having a first diameter and adjacent the first end portion 72 is a second stepped end portion 74 having a larger second diameter for mounting in the base. See FIGS. 2 and 3. In the locked condition, the second biasing means 41 biases the plunger in the first direction so that the second side 66 of the first arm of the latch lever 58 is adjacent or radially outboard the first stepped end portion 72. In this condition, the latch lever 58 cannot pivot or rotate. To change to an unlocked condition, the plunger 29 is moved axially against the bias of third spring 41 (see FIG. 3) in a second direction 78 opposite the first direction either electrically or mechanically. In other words, in the unlocked condition, the plunger is moved in the second direction 78 a sufficient distance so the end wall 32 is clear of the second side 66 of the latch lever 58 allowing the latch lever 58 to rotate and latch protrusion 34 to move away from the striker 36.

Figure 5A:
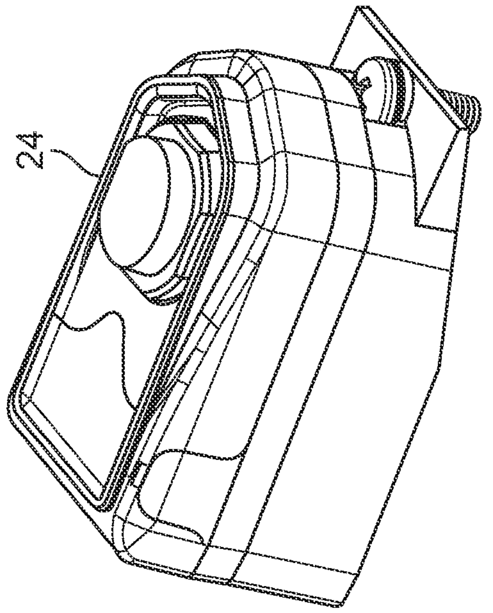
FIGS. 5A-C are perspective views and a side view of the inventive electro-mechanically locking compression latch in an unlocked condition with portions of the latch removed.
Figure 5B:
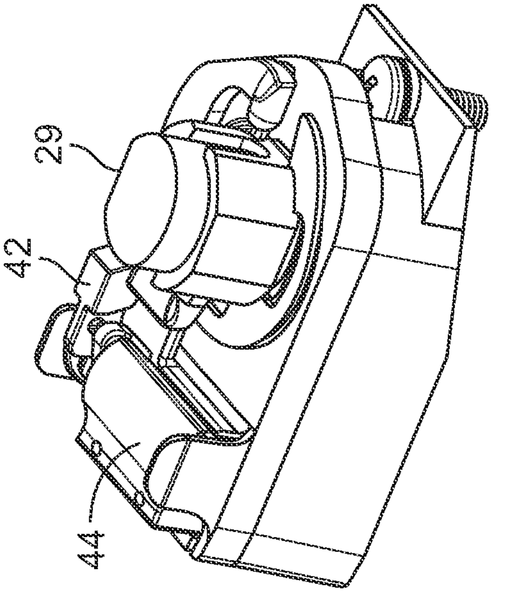
Figure 5C:
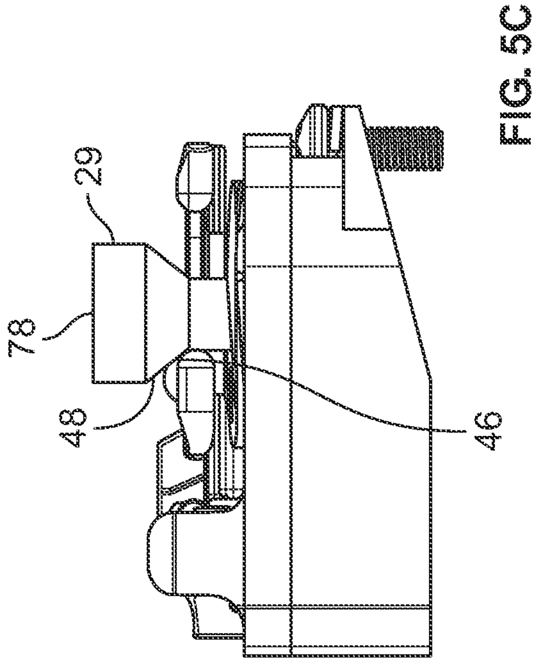

In one embodiment, as better seen in FIGS. 3, 4 and 5, the generally cylindrical or spool shaped (with one flat side) plunger can be moved in the second direction 78 electrically through gearing 42 connected to an electric motor 44. The gears drive a cam follower 46 against the cam chamfer 48 located intermediately on the plunger to move the plunger 29 axially in the second direction 78 against the bias of the second means 41 to an unlocked condition. As seen in FIG. 2D, this allows the second side 66 the first arm of latch or tooth 34 to move into a space beyond the first end of the plunger if the operator pushes the back side of the second arm 40 or button 38 to rotate the latch lever 58 against the second biasing means 68. Since the first end portion 72 has been axially moved out of the way, by pushing the button 38, the operator rotates the latch lever 58 against the bias of the first means 68, which pivots the second lever 38, and the latch protrusion 34 disengages from the striker 36 to an open condition. Accordingly, if button 38 is pushed in this unlocked condition, the first spring will rotate the first lever 15 to an open condition.

As seen in FIG. 6C, the latch or latch protrusion 34 is free to move away from the striker even if the key 28 and key plug 26 are in the locked position when the plunger 29 is moved axially in the second direction by the electrical force. This allows the operator to open the latch assembly 10 by pushing the button 38 after only an electrical signal, without the need for a key. Associated wiring, as seen in FIG. 7, can send the signal and electrical power to the motor or force generator. Alternatively, the motor may be powered by an integral battery and electrical signals may be provided to it either by wires or wirelessly. In one embodiment, a FOB separate from the vehicle FOB or a button on a nearby handle can initiate the electrical signal. In another embodiment, a signal that originates from a system similar to that shown in U.S. Pat. Nos. 11,203,324, and 11,577,693, assigned to the assignee of the instant application and incorporated in their entirety herein by reference, can originate the signal.

Although the drawings show a motor and associated gearing driving the plunger 29 against the first biasing means such as a spring 41 other devices can be used to move the plunger 29. For example, in a second embodiment, the electrical signal is transmitted to a solenoid or electrical linear actuator to move plunger 29 in the second direction 78 against the third biasing means 41 to create the unlocked condition. Although a spring is initially depicted in the drawings, other means for biasing the plunger in the first direction 76, such as a polymer pillow or magnet or vacuum, are also contemplated. Alternatively, the linear actuator could move the plunger in both directions with little or no latent bias. In another embodiment, the plunger 29 is mounted in the base 12 for rotational movement instead of axial movement and an electrical actuator rotates the plunger approximately 180 degrees from a rest position. In this embodiment, the first end portion of the plunger 29 is shaped so that it only contacts the second side 66 of the first arm of the latch lever when the electrical actuator pivots the plunger.

The latch assembly 10 can also be changed from a locked condition to an unlocked condition by an appropriate key 28 rotating the key plug 26. The rotation of the key plug 26 allows the cam face 56 of the plug actuator 54 to cooperate with the cam 30 of the end surface 32 of the plunger 29 to move the plunger in the second direction 78 against the bias of the second biasing means or spring 41. In one embodiment, this moves the first end portion 72 axially away from the second side 66 of the first arm 60 of the second lever 58 to place the second side 66 adjacent a space beyond the first end of the plunger 29, This will allow for rotation of the second end 66 of the first arm of the second lever 58 when the button 38 is pushed. This moves the latch protrusion or tooth 34 away from the striker 36 in an unlocked condition. In other words, the axial movement of the plunger caused by the rotation of cam surface of the key plug actuator 54 creates a space below the plunger 29 and away from the cam side 56 of the actuator 54 to allow the second side 66 of the first arm 60 of the second lever 58 to move in an unlocked condition.

Figure 6A:
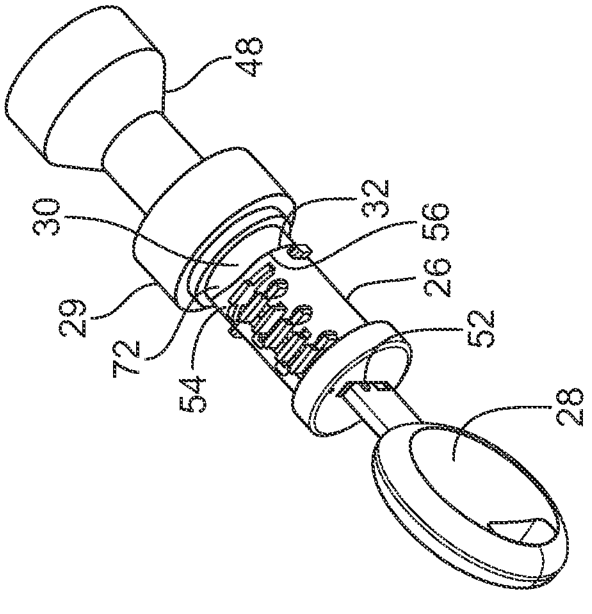

FIG. 6 shows three potential conditions of the lockable latch 10. FIG. 6A shows the key plug 26 and plunger 29 in the locked condition. FIG. 6 B shows the key plug 26 rotated clockwise ninety degrees by an appropriate key 28 into an unlocked condition. FIG. 6 C shows the key plug 26 still in the locked orientation, but the plunger 29 has been moved axially by the cam follower 46 (not shown) into an unlocked condition. As can be appreciated, the lockable latch can also be in the unlocked condition if the plunger 29 has been moved by the cam follower 46 if the key plug 26 is in the unlocked condition.

I claim:

1. A compression latch for releasably latching a first surface to a second surface comprising;

a base mounted on the first surface and having a striker;

a first pivot axis associated with the base;

a first lever pivotable about the first pivot axis having a first arm, with the first arm having a contact at its distal end for releasably contacting the second surface;

the first lever also having a second arm, the second arm having a latch lever pivotable about a second axis on the second arm of the first lever and having a first arm with a first side that cooperates with the striker to keep the first lever from pivoting when the latch lever first side and the striker are engaged and a second side, the latch lever also having a second arm;

a first means for biasing the first side of the latch lever into engagement with the striker;

a plunger mounted on the base for axial movement with respect to the base, the plunger having a cam shaped first end surface, a first end portion adjacent the first end having a first diameter;

a second means for biasing the plunger in a first direction and into a locked condition wherein the latch lever first arm first side is engaged with the striker and the latch lever first arm second side is in contact with the plunger first end portion;

an electric motor mounted on the base and having an output shaft;

wherein, upon receiving an electrical signal to the motor, the output shaft moves the plunger axially against the urging of the spring in a second direction opposite the first direction so the latch lever first arm second side is radially spaced beyond the first end of the plunger and into a first unlocked condition;

a substantially cylindrical key plug rotatably mounted on the second arm of the first lever having a keyway with an opening at a first end to accept a key within the key plug and an actuator at a second end of the key plug, the actuator having a cam end surface that cooperates with the cam surface at the first end of the plunger to move the plunger axially in the second direction against the urging of the second biasing means when the key and key plug are turned from a locked to an unlocked position so the latch lever first arm second side is radially spaced from beyond the first end of the plunger in a second unlocked condition;

whereby the latch can be opened in either the first or second unlocked condition by the operator pushing the latch lever second arm and pivoting the latch lever opposite the bias of the first biasing means disengaging the latch lever first side from the striker.

2. The compression latch of claim 1 wherein the first biasing means is a spring or resilient polymer.

3. The compression latch of claim 1 wherein the second biasing means is a spring or resilient polymer.

4. The compression latch of claim 1 wherein the key plug rotates about an axis normal to the second arm of the first lever.

5. The compression latch of claim 1 wherein the contact at the distal end of the first arm of the first lever is adjustable to vary the distance between the first and second surfaces when the latch is in the closed condition.

6. The compression latch of claim 1 also having a spring that biases the first lever into an open condition with the contact is spaced from the second surface.

7. A compression latch for releasably latching a first surface to a second surface comprising;

a base mounted on the first surface and having a striker;

a first pivot axis associated with the base;

a first lever pivotable about the first pivot axis having a first arm, with the first arm having a contact at its distal end for releasably contacting the second surface;

the first lever also having a second arm, the second arm having a latch lever pivotable about a second axis on the second arm of the first lever and having a first arm with a first side that cooperates with the striker to keep the first lever from pivoting when the latch lever first side and the striker are engaged and a second side, the latch lever also having a second arm;

a first means for biasing the first side of the latch lever into engagement with the striker;

a plunger mounted on the base for axial movement with respect to the base, the plunger having a cam shaped first end surface, a first end portion adjacent the first end with the first end portion having a diameter;

a second means for biasing the plunger in a first direction and into a locked condition wherein the latch lever first arm first side is engaged with the striker and the latch lever first arm second side is in contact with the plunger first end portion;

an electrically powered linear actuator mounted on the base;

wherein, upon receiving an electrical signal the linear actuator moves the plunger axially against the urging of the second biasing means in a second direction opposite the first direction so the latch lever first arm second side is radially spaced from beyond the plunger first end portion and into a first unlocked condition;

a key plug rotatably mounted on the second arm of the first lever having a keyway with an opening at a first end to accept a key within the key plug and an actuator at a second end of the key plug, the actuator having a cam end surface that cooperates with the cam surface at the first end of the plunger to move the plunger axially in the second direction against the urging of the second biasing means when the key and key plug are turned from a locked to an unlocked position so the latch lever first arm second side is radially spaced from beyond the first end of the plunger in a second unlocked condition;

whereby the latch can be opened in either the first or second unlocked condition by the operator pushing the latch lever second arm and pivoting the latch lever opposite the bias of the first biasing means disengaging the latch lever first side from the striker.

8. The compression latch of claim 7 wherein the first biasing means is a spring or resilient polymer.

9. The compression latch of claim 7 wherein the second biasing means is a spring or resilient polymer.

10. The compression latch of claim 7 wherein the key plug rotates about an axis normal to the second arm of the first lever.

11. The compression latch of claim 7 wherein the contact at the distal end of the first arm of the first lever is adjustable to vary the distance between the first and second surfaces when the latch is in the closed condition.

12. The compression latch of claim 7 also having a spring that biases the first lever into an open condition with the contact is spaced from the second surface.

13. A compression latch for releasably latching a first surface to a second surface comprising;

a base mounted on the first surface and having a striker;

a first pivot axis associated with the base;

a first lever pivotable about the first pivot axis having a first arm, with the first arm having a contact at its distal end for releasably contacting the second surface;

a spring that biases the first lever so the contact is pivoted away from the second surface;

the first lever also having a second arm, the second arm having a latch lever pivotable about a second axis on the second arm of the first lever and having a first arm with a first side that cooperates with the striker to keep the first lever from pivoting when the latch lever first side and the striker are engaged and a second side, the latch lever also having a second arm;

a first means biasing the latch lever so its first arm first side is engaged with the striker;

a plunger mounted on the base for axial movement with respect to the base, the plunger having a cam shaped first end surface and a first end portion adjacent the first end with the first end portion having a diameter;

a second biasing means urging the plunger in a first direction and into a locked condition wherein the latch lever first arm first side is engaged with the striker and the latch lever first arm second side is in contact with the plunger first end portion;

an electric force generator mounted on the base;

wherein, upon receiving an electrical signal, the force generator moves the plunger axially against the urging of the second biasing means in a second direction opposite the first direction so the latch lever first arm second side is radially spaced from beyond the end of the plunger first end surface;

a key plug rotatably mounted on the second arm having a keyway with an opening at a first end to accept a key within the key plug and an actuator at a second end of the key plug, the actuator having a cam end surface that cooperates with the cam surface at the first end of the plunger to move the plunger axially in the second direction against the urging of the second biasing means when the key and key plug are turned from a locked to an unlocked position so the latch lever first arm second side is radially spaced from beyond the end of the plunger in a second unlocked condition;

whereby the latch can be opened in either the first or second unlocked condition by the operator pushing the latch lever second arm and pivoting the latch lever opposite the bias of the first biasing means disengaging the latch lever first arm first side from the striker and the spring pivots the first lever to move the contact away from the second surface.

14. The compression latch of claim 13 wherein the first surface is a door and the second surface is a frame around the door.

15. The compression latch of claim 13 wherein the latch lever second arm has a button protruding from one side, and the latch is opened by the operator pushing the button.

16. The compression latch of claim 13 wherein the first and second biasing means are springs or resilient polymers.

* * * * *